US012624561B1

(12) United States Patent
Zhao et al.

(10) Patent No.: US 12,624,561 B1
(45) Date of Patent: May 12, 2026

(54) POOL CHLORINE FLOATER WITH LIGHT

(71) Applicant: SICHUAN COOTWAY TECHNOLOGY CO., LTD., Deyang (CN)

(72) Inventors: Chunhai Zhao, Deyang (CN); Daiquan Li, Deyang (CN); Gangbin Wan, Sichuan Province (CN)

(73) Assignee: SICHUAN COOTWAY TECHNOLOGY CO., LTD., Deyang (CN)

( * ) Notice: Subject to any disclaimer, the term of this patent is extended or adjusted under 35 U.S.C. 154(b) by 0 days.

(21) Appl. No.: 19/304,833

(22) Filed: Aug. 20, 2025

(30) Foreign Application Priority Data

Aug. 4, 2025 (CN) ......................... 202521647264.6

(51) Int. Cl.

| | |
|---|---|
| ***E04H 4/12*** | (2006.01) |
| ***C02F 1/68*** | (2023.01) |
| ***F21S 9/03*** | (2006.01) |
| ***F21V 15/01*** | (2006.01) |
| ***F21V 23/00*** | (2015.01) |
| ***F21V 31/00*** | (2006.01) |
| *F21W 131/401* | (2006.01) |

(52) U.S. Cl.
CPC ............ *E04H 4/1281* (2013.01); *F21S 9/037* (2013.01); *F21V 15/01* (2013.01); *F21V 23/005* (2013.01); *F21V 31/005* (2013.01); *F21W 2131/401* (2013.01)

(58) Field of Classification Search
CPC ................................ E04H 4/1281; C02F 1/688
See application file for complete search history.

(56) References Cited

U.S. PATENT DOCUMENTS

| | | | | |
|---|---|---|---|---|
| 2013/0335953 A1* | 12/2013 | Gold | ........................ | F21V 3/026<br>362/190 |
| 2022/0412113 A1* | 12/2022 | Zhang | ...................... | C02F 1/687 |
| 2025/0171336 A1* | 5/2025 | Gong | ........................ | G01K 1/14 |

* cited by examiner

*Primary Examiner* — Kevin Joyner

(57) ABSTRACT

A pool chlorine floater with light includes an outer housing. The outer housing is used for enabling the pool chlorine floater with light to float on a water surface. The outer housing includes an accommodating cavity. The accommodating cavity is configured for loading a disinfection material. The accommodating cavity includes a first window. The first window is configured for allowing water to pass through. The outer housing further includes an opening. The opening is arranged facing upwards. The opening is in communication with the accommodating cavity. The disinfection material is filled into the accommodating cavity via the opening. The pool chlorine floater with light includes a cover plate. The cover plate and the outer housing are detachably connected, and the cover plate is configured for covering the opening.

17 Claims, 8 Drawing Sheets

POOL CHLORINE FLOATER WITH LIGHT

CROSS-REFERENCE TO RELATED APPLICATIONS

The application claims priority of Chinese patent application CN2025216472646, filed on Aug. 4, 2025, which is incorporated herein by reference in its entirety.

TECHNICAL FIELD

The present invention relates to the field of flotation devices, in particular to a pool chlorine floater with light.

BACKGROUND ART

In recent years, swimming pool chlorinators have emerged and become popular due to their environment-friendly and convenient properties. At present, most of the commercially available swimming pool chlorinators in the market need to be lifted from water when replacing the disinfection material, and then the housing has to be disassembled to add the disinfection material, which is very troublesome. Moreover, many swimming pool chlorinators are not provided with a lighting function, or although they have a lighting function, they require frequent replacement of the battery. Therefore, the present invention provides a pool chlorine floater with light, which can effectively solve the above problems.

SUMMARY

In order to overcome the shortcomings of the prior art, the present invention provides a pool chlorine floater with light. The pool chlorine floater with light includes an outer housing, a first lamp group, a battery, and at least one solar panel.

The outer housing is configured for enabling the pool chlorine floater with light to float on a water surface.

The outer housing includes an accommodating cavity. The accommodating cavity is configured to be filled with a disinfection material. The accommodating cavity includes a first window. The first window is configured for allowing water to pass through. The outer housing further includes an opening. The opening is arranged facing upward. The opening is in communication with the accommodating cavity. The disinfection material is filled into the accommodating cavity through the opening.

The first lamp group is arranged facing downward. The first lamp group is configured for emitting light into the water;

The battery is electrically connected to the first lamp group. The battery is configured for supplying power to the first lamp group.

The solar panel is electrically connected to the battery. The solar panel is configured for converting light energy into electrical energy to charge the battery.

Furthermore, the pool chlorine floater with light further includes a cover plate. The cover plate is detachably connected to the outer housing. The cover plate is configured for covering the opening.

Furthermore, the pool chlorine floater with light further includes an adjusting housing. The adjusting housing is rotatably arranged on the outer housing. The adjusting housing is rotatable between a first position where at least one part of the first window is blocked by the adjusting housing, and a second position where the first window is fully opened. The adjusting housing includes a second window. The second window corresponds to the first window in position. Water enters through the second window and flows through the first window into the accommodating cavity. A chlorinated material dissolved by water flows through the first window and then is discharged from the second window. The adjusting housing is rotated to adjust a blocked area of the first window, so as to control a discharge amount of the dissolved disinfection material.

Furthermore, the outer housing includes a flange. The flange is arranged at the opening. When the cover plate covers the opening, the flange is configured for supporting the cover plate.

Furthermore, the cover plate includes a first connecting portion. The outer housing includes a second connecting portion. The first connecting portion is connected to the second connecting portion, so that the cover plate is mounted on the outer housing.

Furthermore, the first connecting portion includes a sliding bar and a stop block. The sliding bar includes a first end and a second end. The stop block is arranged at an end portion of the second end. The cover plate further includes a notch. The notch is adjacent to the sliding bar. When the cover plate covers the opening, the second connecting portion enters the notch, the cover plate is rotated to cause the second connecting portion to overlap the first end, the cover plate is further configured to rotate so that the second connecting portion slides towards the second end, and the stop block is configured for preventing the second connecting portion from continuing to slide. The cover plate is rotated in an opposite direction to slide the second connecting portion from the second end to the first end until the second connecting portion slides out of the sliding bar into the notch, so that the cover plate can be removed.

Furthermore, a third connecting portion is provided on an inner wall of the adjusting housing. The outer housing further includes a sliding slot. The third connecting portion is arranged in the sliding slot in a manner such that the adjusting housing is rotatably connected with the outer housing.

Furthermore, a bottom portion of the accommodating cavity includes a first through hole, so that water enters the accommodating cavity through the first through hole, and the disinfection material in the accommodating cavity diffuses into the water from the first through hole.

Furthermore, the cover plate includes a vent hole. The vent hole is in communication with the accommodating cavity to keep air pressure in the accommodating cavity balanced.

Furthermore, the cover plate further includes a handle and a groove. The handle and the groove are arranged on an upper surface of the cover plate. The handle and the groove are arranged at intervals. The handle and the groove are configured for rotating the cover plate.

Furthermore, the pool chlorine floater with light further includes a second lamp group. The second lamp group is arranged facing upward.

Furthermore, the outer housing includes a first housing, a second housing, and a third housing. The first housing, the second housing, and the third housing are arranged in sequence from top to bottom. The accommodating cavity is arranged at a bottom portion of the first housing. The first housing includes a fourth connecting portion. The second housing includes a fifth connecting portion. The fourth connecting portion and the fifth connecting portion are connected to each other, so that the first housing and the second housing are connected to each other.

Furthermore, the third housing includes a sixth connecting portion. The second housing includes a first engaging slot. The sixth connecting portion is engaged in the first engaging slot, so that the third housing is connected to the second housing. A sealed cavity is formed between the second housing and the third housing. The second light group, the first light group, the solar panel, and the battery are arranged within the sealed cavity.

Furthermore, the first engaging slot includes a first sealing member. The sixth connecting portion is engaged in the first engaging slot and configured for compressing the first sealing member to increase sealing performance of the sealed cavity.

Furthermore, the third housing further includes a seventh connecting portion. The second housing further includes a second engaging slot. The seventh connecting portion is engaged in the second engaging slot, so that the third housing is connected to the second housing.

Furthermore, the second engaging slot includes a second sealing member. The seventh connecting portion is engaged in the second engaging slot and configured for compressing the second sealing member to increase sealing performance of the sealed cavity.

Furthermore, the third housing is made of a transparent material. A plurality of diamond-shaped bumps or dot-shaped protrusions are provided on an inner wall of the third housing. The diamond-shaped bumps or the dot-shaped protrusions are configured for refracting light emitted by the first lamp group.

Furthermore, the second housing includes a light-transmitting first cover and a light-transmitting second cover. The first cover is arranged on the second lamp group. The first cover is configured for protecting the second lamp group. The second cover is arranged on the solar panel. The second cover is configured for protecting the solar panel.

Furthermore, a total number of the solar panels is two. The two solar panels are arranged at two opposite sides of the pool chlorine floater with light.

Furthermore, the pool chlorine floater with light further includes a control main board and a control switch. The control switch and the battery are electrically connected to the control main board.

Beneficial effects of the present invention are as follows. The present invention provides the pool chlorine floater with light, which is capable of floating in water. The opening is formed in an upper portion thereof, and the disinfection material can be directly added into the accommodating cavity through the opening, without needing to take the pool chlorine floater with light out of the water or disassemble it for adding the disinfection material, thus facilitating user operation. In addition, the pool chlorine floater with light is provided with the solar panel, the second lamp group, and the first lamp group. The second lamp group is arranged facing upward, and the first lamp group is arranged facing downward. The second lamp group and the first lamp group are provided with a plurality of lighting effects, providing the user with more interest and ornamental value. The two oppositely arranged solar panels can effectively absorb sunlight from different angles, and convert light energy into electrical energy to charge the pool chlorine floater with light, eliminating the need for battery replacement and improving user experience.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
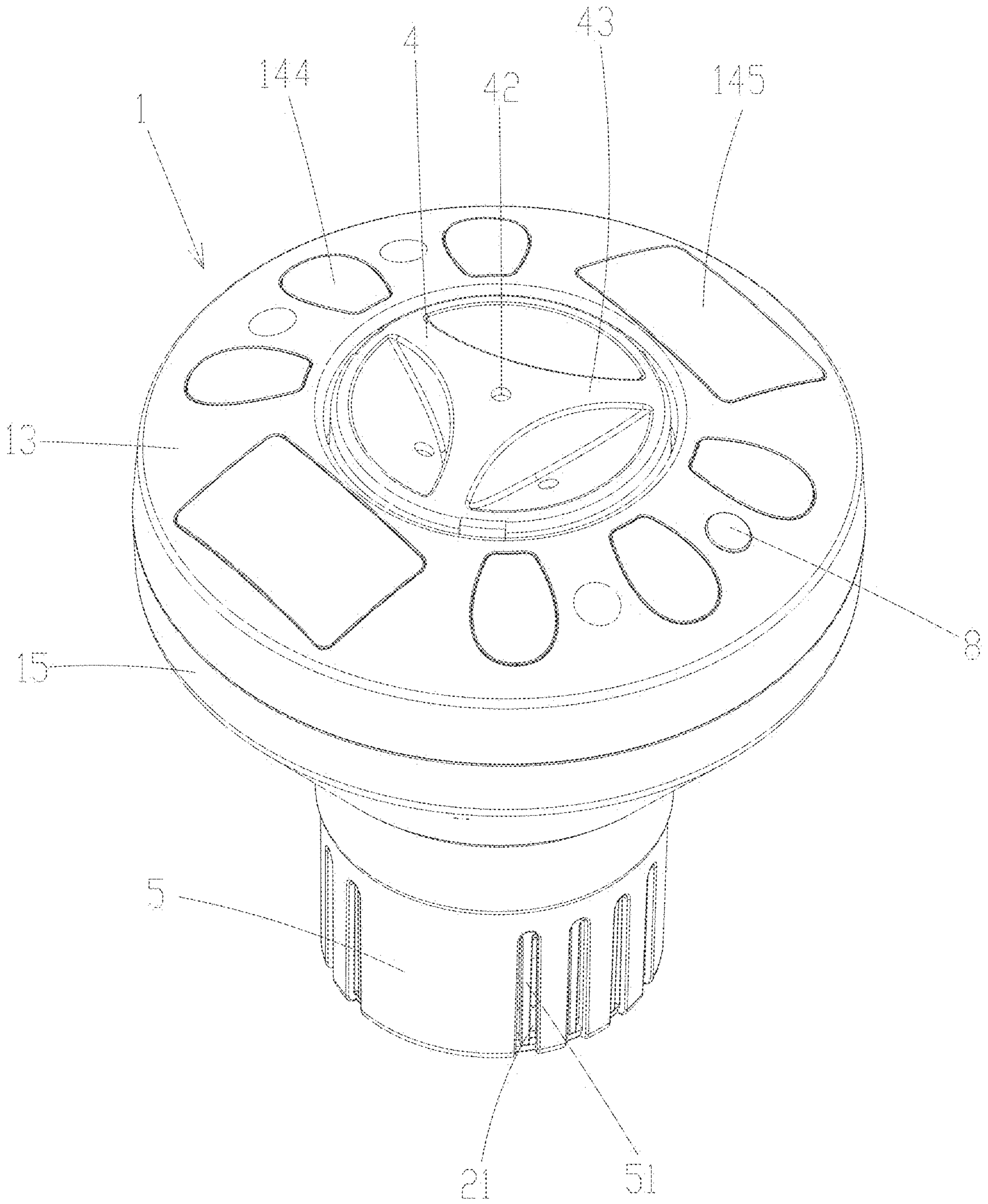
FIG. 1 is a perspective view of a pool chlorine floater with light according to Embodiment 1 of the present invention.
Figure 2:
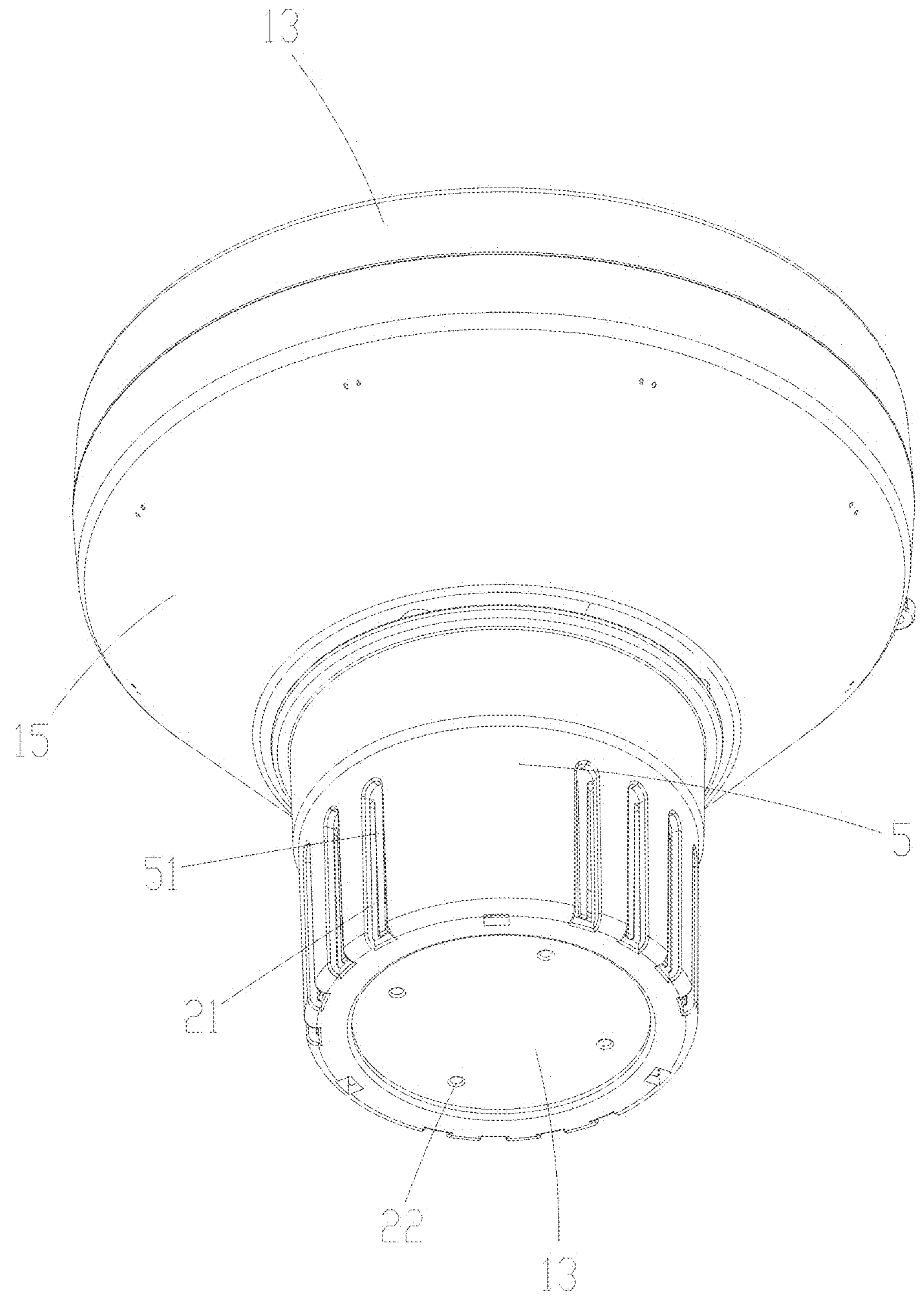
FIG. 2 is another perspective view of Embodiment 1 of the pool chlorine floater with light of the present invention.
Figure 3:
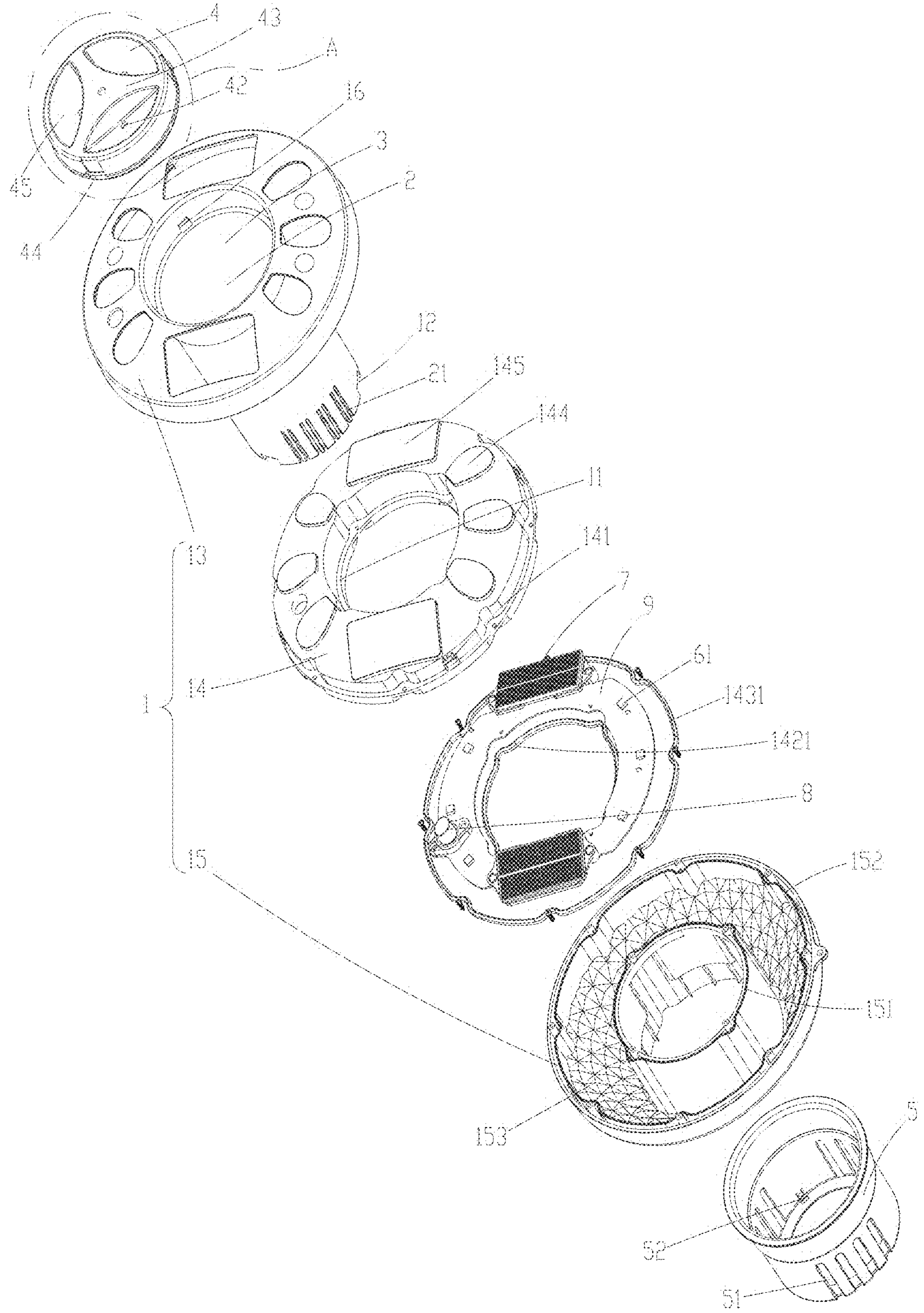
FIG. 3 is an exploded view of Embodiment 1 of the pool chlorine floater with light of the present invention.
Figure 4:
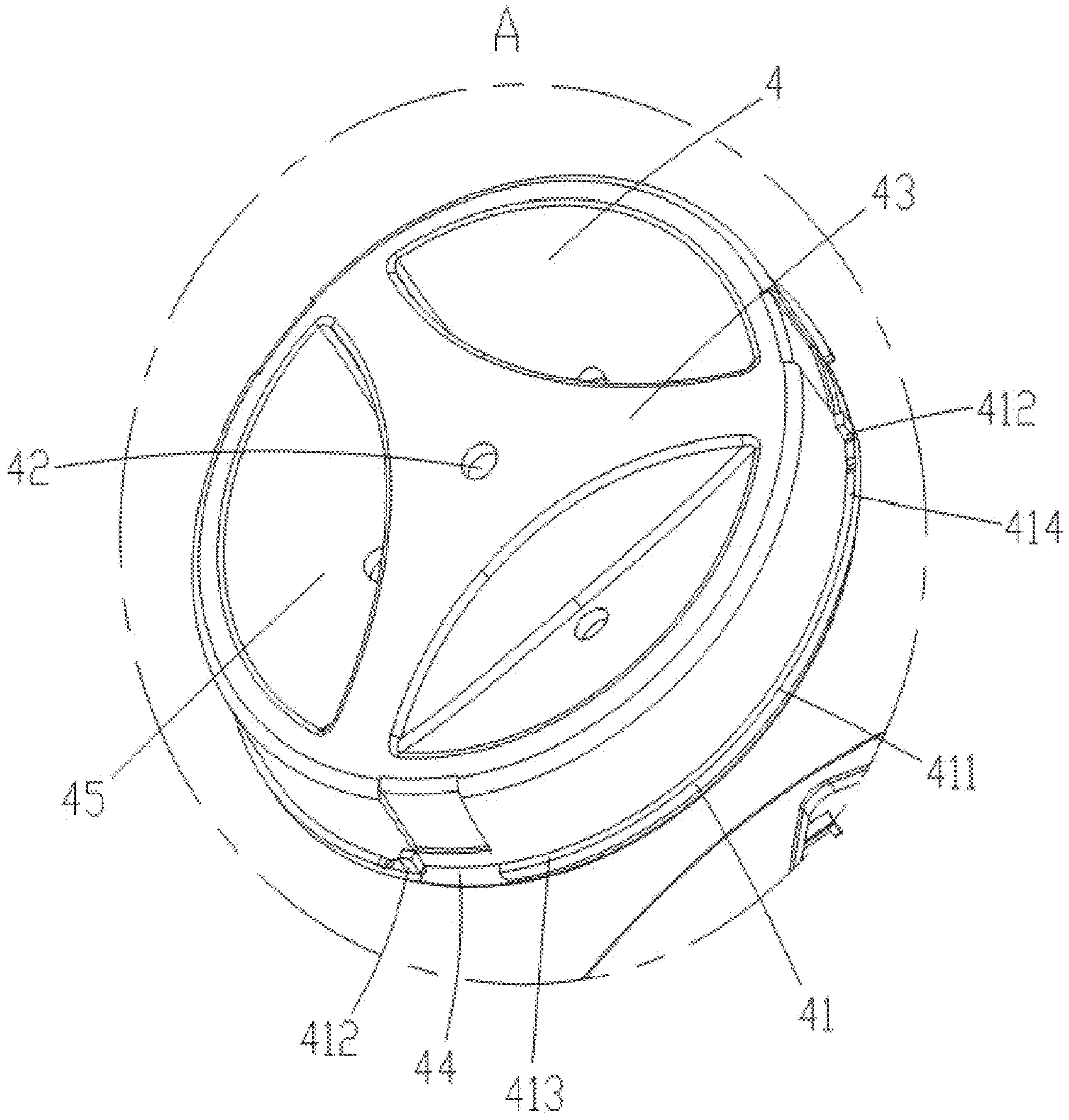
FIG. 4 is an enlarged view of area A in FIG. 3.
Figure 5:
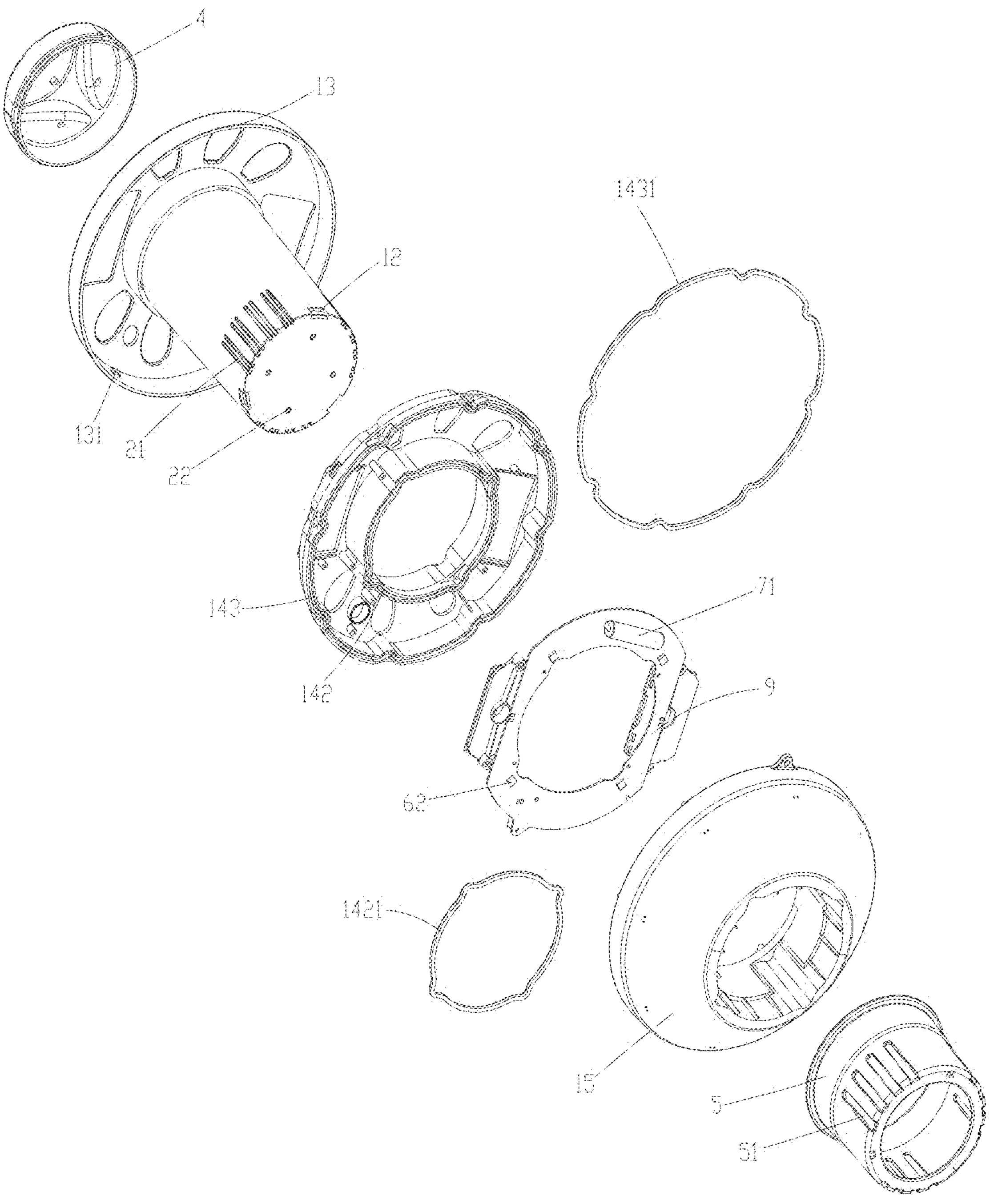
FIG. 5 is another exploded view of Embodiment 1 of the pool chlorine floater with light of the present invention.
Figure 6:
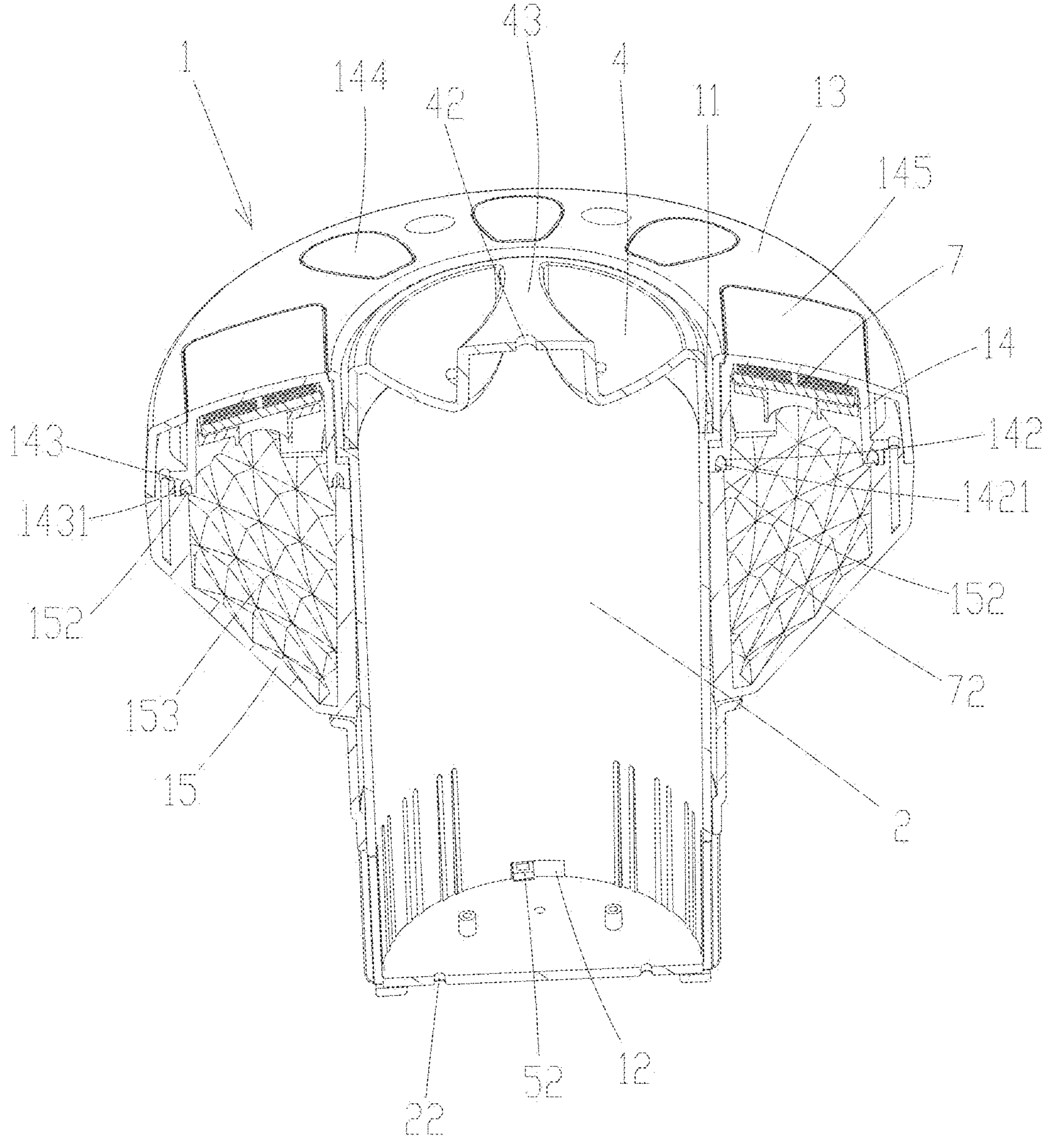
FIG. 6 is a cross-sectional view of Embodiment 1 of the pool chlorine floater with light of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term “comprising” when utilized, means “including, but not necessarily limited to”; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to “an” or “one” embodiment in this disclosure are not necessarily to the same embodiment, and such references can mean “at least one”. In addition, the terms “first” and “second” are used for descriptive purposes only and cannot be understood as indicating or implying relative importance or implying the number of indicated technical features. Thus, the features defined as “first” and “second” may explicitly or implicitly include one or more of the features. In the description of embodiments of the application, “a plurality of” means two or more, unless otherwise specifically defined.

Embodiment 1

Referring to FIG. 1 to FIG. 6, the present invention provides a pool chlorine floater with light. The pool chlorine floater with light includes an outer housing 1, a cover plate 4, a first lamp group 62, a battery 71, and at least one solar panel 7.

The outer housing 1 is configured for enabling the swimming pool chlorinator to float on a water surface.

The outer housing 1 includes an accommodating cavity 2. The accommodating cavity 2 is configured for loading a disinfection material. The accommodating cavity 2 includes a first window 21, and the first window 21 is configured for allowing water to pass through. The outer housing 1 further includes an opening 3. The opening 3 is arranged facing upwards. The opening 3 is in communication with the accommodating cavity 2, and the disinfection material is filled into the accommodating cavity 2 via the opening 3.

The cover plate 4 is detachably connected to the outer housing 1, and the cover plate 4 is configured to cover the opening 3.

The first lamp group 62 is arranged facing downwards, and the first lamp group 62 is configured for emitting light to illuminate the water.

The battery 71 is electrically connected to the first lamp group 62, and the battery 71 is configured for supplying power to the first lamp group 62.

The solar panel 7 is electrically connected to the battery 71, and the solar panel 7 is configured for converting light energy into electrical energy to charge the pool chlorine floater with light.

Through the above-described structure, the pool chlorine floater with light includes the outer housing 1. The outer housing 1 is configured to allow the pool chlorine floater with light to float on the water surface, making it more convenient for a user to disinfect water. A lower portion of the outer housing 1 is provided with the accommodating cavity 2, and the accommodating cavity 2 is configured for loading the disinfection material. The accommodating cavity 2 includes the first window 21, and the first window 21 is configured for allowing water to pass through. After the water enters the accommodating cavity 2, the disinfection material is dissolved. The dissolved disinfection material flows out of the first window 21 to the water. The outer housing 1 further includes the opening 3. The opening 3 is arranged facing upwards, and the opening 3 is in communication with the accommodating cavity 2. The user can add the disinfection material from above the pool chlorine floater with light, and there is no need to remove the pool chlorine floater with light from the water and disassemble it to add the disinfection material or add the disinfection material from the side, thereby improving the user's experience. The pool chlorine floater with light further includes the first lamp group 62. The first lamp group 62 is arranged facing downwards, and the light emitted by the first lamp group 62 can pass through the outer housing 1 to irradiate the water, providing more enjoyment and ornamental value for the user. The pool chlorine floater with light further includes a battery 71 and at least one solar panel 7. The solar panel 7 is configured to convert light energy into electrical energy to provide sufficient electrical energy for the battery 71, ensuring that the battery 71 provides sufficient electrical energy for the first lamp group 62. Therefore, the user does not need to frequently replace the battery 71. By converting solar energy into electrical energy, this design is economical and environmentally friendly.

In the present embodiment, the pool chlorine floater with light further includes a cover plate 4. The cover plate 4 is detachably connected to the outer housing 1, and the cover plate 4 is configured for covering the opening 3. Through the above-described structure, the cover plate 4 is capable of covering the opening 3, so that the disinfection material can be prevented from being damaged or deteriorated due to exposure to sun and wind, and the user can easily detach and install the cover plate 4, thereby facilitating the user's operation and improving the user experience.

In the present embodiment, the outer housing 1 includes a first housing 13, a second housing 14, and a third housing 15. The first housing 13, the second housing 14, and the third housing 15 are arranged sequentially from top to bottom. The accommodating cavity 2 is provided inside the first housing 13. The first housing 13 includes a fourth connecting portion 131. The second housing 14 includes a fifth connecting portion 141. The fourth connecting portion 131 and the fifth connecting portion 141 are connected to each other, ensuring that the first housing 13 and the second housing 14 are connected to each other. The second lamp group 61, the first lamp group 62, the solar panel 7, and the battery 71 are provided in the sealed cavity 72. Through the above-described structure, the fourth connecting portion 131 and the fifth connecting portion 141 are connected to each other, thereby making the first outer housing 13 and the second outer housing 14 connected more stably.

In the present embodiment, the third housing 15 includes a sixth connecting portion 151. The second housing 14 includes a first engaging slot 142. The sixth connecting portion 151 is engaged in the first engaging slot 142, so that the third housing 15 is connected to the second housing 14. A sealed cavity 72 is formed between the second housing 14 and the third housing 15. The second lamp group 61, the first lamp group 62, the solar panel 7, and the battery 71 are provided in the sealed cavity 72. Through the above structure, the sixth connecting portion 151 is engaged in the first engaging slot 142, so that the third housing 15 can be connected to the second housing 14 more stably. Moreover, the second lamp group 61, the first lamp group 62, the solar panel 7 and the battery 71 are provided in the sealed cavity 72, so that the second lamp group 61, the first lamp group 62, the solar panel 7 and the battery 71 can be protected from damage. Quite usefully, the first engaging slot 142 includes a first sealing member 1421 configured to improve tightness of the sealed cavity 72.

In the present embodiment, the third housing 15 further includes a seventh connecting portion 152. The second housing 14 further includes a second engaging slot 143. The seventh connecting portion 152 is engaged in the second engaging slot 143, so that the third housing 15 is connected to the second housing 14. Through the above structure, the seventh connecting portion 152 is engaged in the second engaging slot 143, so that the stability of the connection between the third housing 15 and the second housing 14 can be further increased. Quite usefully, the second engaging slot 143 includes a second sealing member 1431, which may further improve the tightness of the sealed cavity 72.

In the present embodiment, the pool chlorine floater with light further includes an adjusting housing 5, and the adjusting housing 5 is rotatably arranged on the outer housing 1. The adjusting housing 5 is rotatable between a first position where at least one part of the first window 21 is blocked and a second position where the first window 21 is fully opened. Specifically, the adjusting outer housing 5 is rotatably arranged on the third housing 15. The adjusting housing 5 includes a second window 51, and the second window 51 is arranged corresponding to the position of the first window 21. The water enters from the second window 51, and enters the accommodating cavity 2 after flowing through the first window 21. A chlorinated material dissolved by the water flows through the first window 21 and then is discharged from the second window 51. Rotating the adjusting housing 5 can adjust the size of the blocked area of the first window 21, so as to control the discharge amount of dissolved chlorinated material. Specifically, when the adjusting housing 5 is rotated to make the position of the second window 51 completely correspond to the position of the first window 21, the discharge amount of the dissolved chlorinated material is the largest; when the adjusting housing 5 is rotated to make the position of the second window 51 relatively offset from the position of the first window 21, the first window 21 is gradually blocked, and the discharge amount of the dissolved chlorinated material gradually decreases until the second window 51 or the first window 21 is completely blocked, and at this time, the discharge amount of the dissolved chlorinated material is the smallest.

In the present embodiment, an inner wall of the adjusting housing 5 is provided with a third connecting portion 52. The outer housing 1 further includes a sliding slot 12. The third connecting portion 52 is slidably arranged in the sliding slot 12, so that the adjusting housing 5 is rotatably connected to the outer housing 1. Through the structure provided above, the sliding slot 12 is provided with a certain width for the third connecting portion 52 to be engaged in the sliding slot 12, and the third connecting portion is slidable in the sliding slot 12. The width of the sliding slot 12 is equal to the distance that the adjusting housing 5 can rotate.

In the present embodiment, the outer housing 1 includes a flange 11. The flange 11 is arranged at the opening 3. When the cover plate 4 covers the opening 3, the flange 11 is configured for supporting the cover plate 4. Specifically, the flange 11 is arranged on the first housing 13. When the cover plate 4 is closed over the opening 3, an outer surface of the cover plate 4 overlaps the flange 11, and the flange 11 supports the cover plate 4 to prevent the cover plate 4 from falling into the accommodating cavity 2.

In the present embodiment, the cover plate 4 includes a first connecting portion 41. The outer housing 1 includes a second connecting portion 16. The first connecting portion 41 is connected to the second connecting portion 16, so that the cover plate 4 is mounted on the outer housing 1. Through the above-described structural arrangement, the stability of the connection between the cover plate 4 and the outer housing 1 can be increased by the connection between the first connecting portion 41 and the second connecting portion 16. Quite usefully, the first connecting portion 41 includes a sliding bar 411 and a stop block 412. The sliding bar 411 includes a first end 413 and a second end 414. The stop block 412 is provided at an end portion of the second end 414. The cover plate 4 further includes a notch 44, and the notch 44 is adjacent to the sliding bar 411. Through the above-described structural arrangement, when the cover plate 4 covers the opening 3, the second connecting portion 16 enters the notch 44, the cover plate 4 is rotated to enable the second connecting portion 16 to overlap the first end 413 of the sliding bar 411, and the cover plate 4 abuts against the flange 11; then the cover plate 4 is further rotated to make the second connecting portion 16 slide from the first end 413 of the sliding bar 411 to the second end 414 until the first connecting portion 41 abuts against the stop block 412, so that the cover plate 4 stops rotating, and at this time, the cover plate 4 is locked with the outer housing 1. When the cover plate 4 is rotated in a reverse direction, the second connecting portion 16 moves away from the stop block 412 and slides from the second end 414 to the first end 413 until the second connecting portion 16 slides out of the sliding bar 411 into the notch 44, so that the cover plate 4 can be removed. The structure is simple, and the operation is convenient.

In the present embodiment, the cover plate 4 includes a handle 43 and a groove 45. The handle 43 and the groove 45 are arranged on an upper surface of the cover plate 4. The handle 43 and the groove 45 are arranged at intervals. Through the above-described structural arrangement, a user can insert fingers into the groove 45, grip the handle 43, and rotate the handle 43 to rotate the cover plate 4, making it convenient for the user to rotate and remove the cover plate 4 and enhancing the user's experience. Quite usefully, the cover plate 4 further includes a vent hole 42. The vent hole 42 is in communication with the accommodating cavity 2. The accommodating cavity 2 is capable of exchanging air through the vent hole 42, so that the air pressure in the accommodating cavity 2 is kept balanced.

In the present embodiment, a bottom portion of the accommodating cavity 2 includes a first through hole 22. Through the above-described structure, water can enter the accommodating cavity 2 via the first through hole 22, and the dissolved disinfection material can diffuse into the water via the first through hole 22 at the bottom portion, making the disinfection range of the pool chlorine floater with light more uniform.

In the present embodiment, the pool chlorine floater with light further includes a second lamp group 61, a control main board 9, and a control switch 8. Through the structure above, the control main board 9 is configured to be electrically connected to the second lamp group 61, the first lamp group 62, the control switch 8, and the battery 71 respectively. The second lamp group 61 and the first lamp group 62 are capable of emitting a plurality of colors of light, and are also provided with lamp effects such as gradient, breathing, and flickering. The control switch 8 is capable of controlling the start and stop of both the second lamp group 61 and the first lamp group 62, and switching light modes. The battery 71 is configured for supplying power to the second lamp group 61 and the first lamp group 62. Specifically, the second lamp group 61 is arranged facing upwards, and is capable of emitting light upwards to bring more visual appeal and fun to the user.

In the present embodiment, the third housing 15 is made of a transparent material. An inner wall of the third housing 15 is provided with a plurality of diamond-shaped bumps 153. The second housing 14 includes a first cover 144. Through the above-mentioned structure, the third housing 15 is located at a lowermost position. The third housing 15 is made of a transparent material. Light emitted by the first lamp group 62 can pass into the water via the third housing 15. Quite usefully, a plurality of dot-shaped protrusions 154 are arranged on an inner wall of the third housing 15, and arc-shaped surfaces of the protrusions are provided with a function of scattering and expanding light, thus allowing the light emitted by the first lamp group 62 to scatter over a larger range. The inner wall of the third housing 15 is provided with the plurality of diamond-shaped bumps 153, and the surfaces of the diamond-shaped bumps 153 face in different directions, so that the light emitted by the first lamp group 62 can be reflected to a plurality of places. The first cover 144 is configured for covering the second lamp group 61. The first cover 144 is made of a transparent material. The first cover 144 is capable of protecting the second lamp group 61 from being damaged.

In the present embodiment, a total number of the solar panels 7 is two, and the two solar panels 7 are arranged opposite to each other on both sides of the control main board 9. Through the above structural arrangement, the two solar panels 7 on both sides can be better exposed to sunlight from different directions, effectively utilizing solar energy, and converting more solar energy into electrical energy to charge the battery 71, thereby providing a longer endurance for the first lamp group 62 and the second lamp group 61. Quite usefully, the second housing 14 further includes a second cover 145. The second cover 145 is made of a transparent material. The second cover 145 is configured for covering the solar panel 7, and the second cover 145 is capable of protecting the solar panel 7 from being damaged.

Embodiment 2

Figure 7:
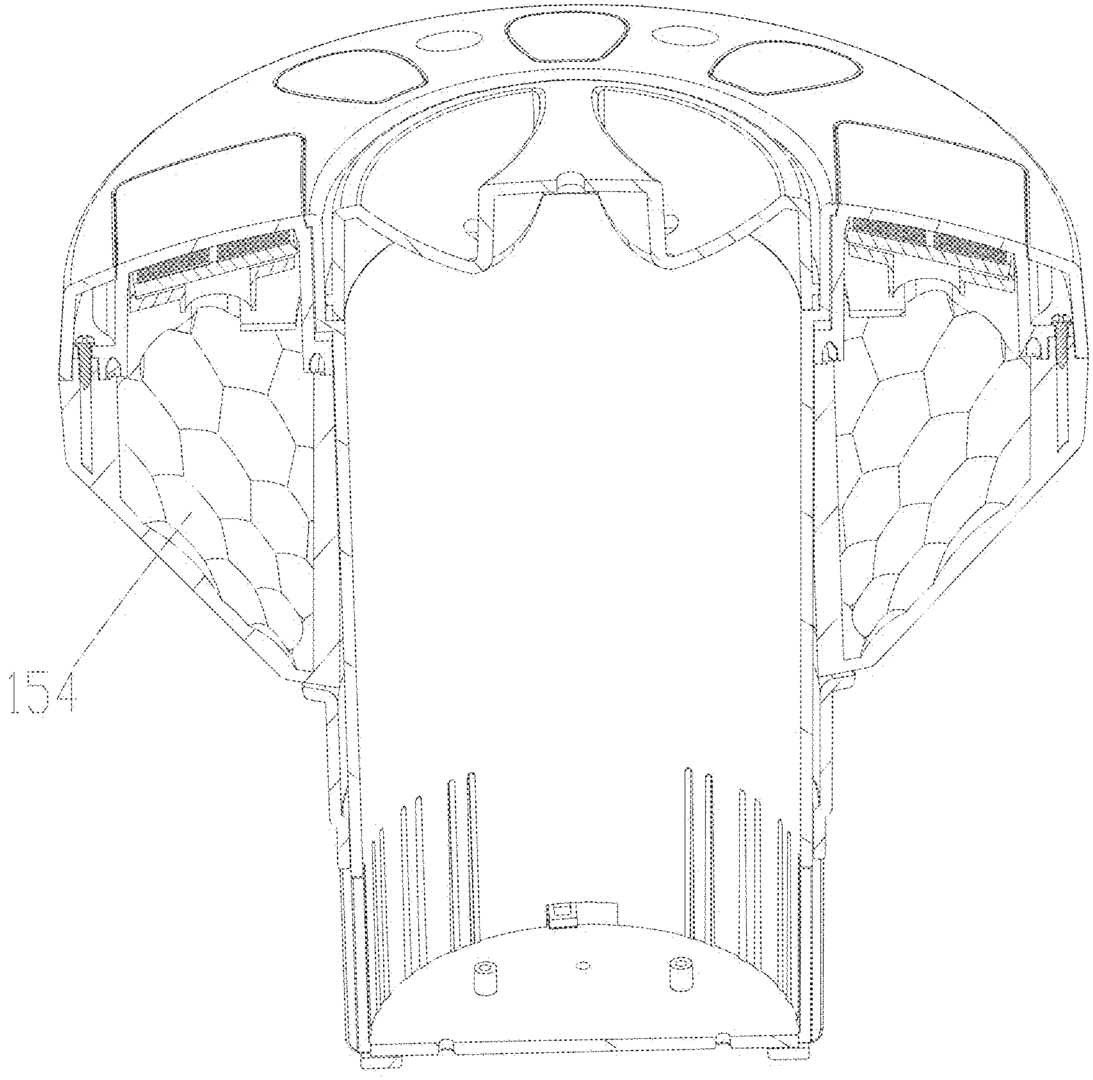
FIG. 7 is another cross-sectional view of Embodiment 1 of the pool chlorine floater with light of the present invention.
Figure 8:
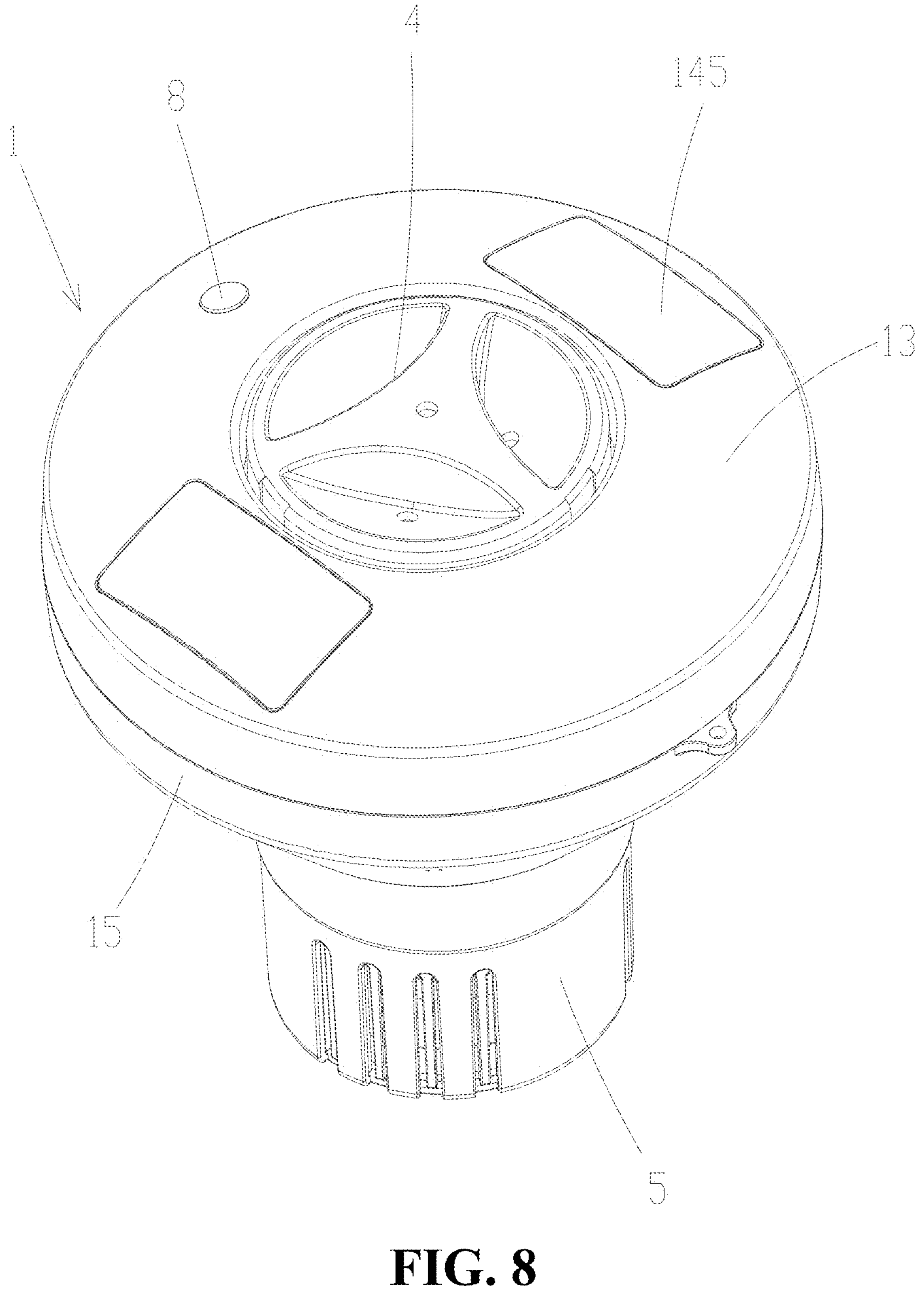
FIG. 8 is a perspective view of a pool chlorine floater with light according to Embodiment 2 of the present invention.

Referring to FIG. 7, compared with Embodiment 1, Embodiment 2 omits the second lamp group 61 and the first cover 144, and the remaining structures are identical to those in Embodiment 1.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A pool chlorine floater with light, comprising:

an outer housing, the outer housing being configured for enabling the pool chlorine floater with light to float on a water surface;

the outer housing comprising an accommodating cavity, the accommodating cavity being configured to be filled with a disinfection material, the accommodating cavity comprising a first window, and the first window being configured for allowing water to pass through; the outer housing further comprising an opening, the opening being arranged facing upward, the opening being in communication with the accommodating cavity, and the disinfection material being filled into the accommodating cavity through the opening;

a first lamp group, wherein the first lamp group is arranged facing downward, and the first lamp group is configured for emitting light into the water;

a battery, wherein the battery is electrically connected to the first lamp group, and the battery is configured for supplying power to the first lamp group; and at least one solar panel, wherein the solar panel is electrically connected to the battery, and the solar panel is configured for converting light energy into electrical energy to charge the battery;

wherein the pool chlorine floater further comprises a second lamp group, wherein the second lamp group is arranged facing upward;

wherein the outer housing comprises a first housing, a second housing, and a third housing; the first housing, the second housing, and the third housing are arranged in sequence from top to bottom; the accommodating cavity is arranged at a bottom portion of the first housing; the first housing comprises a fourth connecting portion, the second housing comprises a fifth connecting portion, and the fourth connecting portion and the fifth connecting portion are connected to each other, so that the first housing and the second housing are connected to each other;

wherein the second housing comprises a light-transmitting first cover and a light-transmitting second cover, the first cover is arranged on the second lamp group, and the first cover is configured for protecting the second lamp group; the second cover is arranged on the solar panel, and the second cover is configured for protecting the solar panel.

2. The pool chlorine floater with light according to claim 1, further comprising a cover plate, wherein the cover plate is detachably connected to the outer housing, and the cover plate is configured for covering the opening.

3. The pool chlorine floater with light according to claim 2, wherein the outer housing comprises a flange, the flange is arranged at the opening, and when the cover plate covers the opening, the flange is configured for supporting the cover plate.

4. The pool chlorine floater with light according to claim 2, wherein the cover plate comprises a first connecting portion, the outer housing comprises a second connecting portion, and the first connecting portion is connected to the second connecting portion, so that the cover plate is mounted on the outer housing.

5. The pool chlorine floater with light according to claim 4, wherein the first connecting portion comprises a sliding bar and a stop block, the sliding bar comprises a first end and a second end, and the stop block is arranged at an end portion of the second end; the cover plate further comprises a notch, and the notch is adjacent to the sliding bar; when the cover plate covers the opening, the second connecting portion enters the notch, the cover plate is rotated to cause the second connecting portion to overlap the first end, the cover plate is further configured to rotate so that the second connecting portion slides towards the second end, and the stop block is configured for preventing the second connecting portion from continuing to slide; the cover plate is rotated in an opposite direction to slide the second connecting portion from the second end to the first end until the second connecting portion slides out of the sliding bar into the notch, so that the cover plate can be removed.

6. The pool chlorine floater with light according to claim 2, wherein the cover plate comprises a vent hole, and the vent hole is in communication with the accommodating cavity to keep air pressure in the accommodating cavity balanced.

7. The pool chlorine floater with light according to claim 2, wherein the cover plate further comprises a handle and a groove, the handle and the groove are arranged on an upper surface of the cover plate, the handle and the groove are arranged at intervals, and the handle and the groove are configured for rotating the cover plate.

8. The pool chlorine floater with light according to claim 1, further comprising an adjusting housing, wherein the adjusting housing is rotatably arranged on the outer housing, and the adjusting housing is rotatable between a first position where at least one part of the first window is blocked by the adjusting housing, and a second position where the first window is fully opened; the adjusting housing comprises a second window, and the second window corresponds to the first window in position; water enters through the second window and flows through the first window into the accommodating cavity, and a chlorinated material dissolved by water flows through the first window and then is discharged from the second window; and the adjusting housing is rotated to adjust a blocked area of the first window, so as to control a discharge amount of the dissolved disinfection material.

9. The pool chlorine floater with light according to claim 8, wherein a third connecting portion is provided on an inner wall of the adjusting housing, the outer housing further comprises a sliding slot, and the third connecting portion is arranged in the sliding slot in a manner such that the adjusting housing is rotatably connected with the outer housing.

10. The pool chlorine floater with light according to claim 1, wherein a bottom portion of the accommodating cavity comprises a first through hole, so that water enters the accommodating cavity through the first through hole, and the disinfection material in the accommodating cavity diffuses into the water from the first through hole.

11. The pool chlorine floater with light according to claim 1, wherein the third housing comprises a sixth connecting portion, the second housing comprises a first engaging slot, and the sixth connecting portion is engaged in the first engaging slot, so that the third housing is connected to the second housing; a sealed cavity is formed between the second housing and the third housing; and the second light group, the first light group, the solar panel, and the battery are arranged within the sealed cavity.

12. The pool chlorine floater with light according to claim 11, wherein the first engaging slot comprises a first sealing member, and the sixth connecting portion is engaged in the first engaging slot and configured for compressing the first sealing member to increase sealing performance of the sealed cavity.

13. The pool chlorine floater with light according to claim 1, wherein the third housing further comprises a seventh connecting portion, the second housing further comprises a second engaging slot, and the seventh connecting portion is engaged in the second engaging slot, so that the third housing is connected to the second housing.

14. The pool chlorine floater with light according to claim 13, wherein the second engaging slot comprises a second sealing member, and the seventh connecting portion is engaged in the second engaging slot and configured for compressing the second sealing member to increase sealing performance of the sealed cavity.

15. The pool chlorine floater with light according to claim 1, wherein the third housing is made of a transparent material, a plurality of diamond-shaped bumps or dot-shaped protrusions are provided on an inner wall of the third housing, and the diamond-shaped bumps or the dot-shaped protrusions are configured for refracting light emitted by the first lamp group.

16. The pool chlorine floater with light according to claim 1, wherein a total number of the solar panels is two, and the two solar panels are arranged at two opposite sides of the pool chlorine floater with light.

17. The pool chlorine floater with light according to claim 1, further comprising a control main board and a control switch, wherein the control switch and the battery are electrically connected to the control main board.

* * * * *